(12) United States Patent
Kemkemian et al.

(10) Patent No.: US 9,035,824 B2
(45) Date of Patent: May 19, 2015

(54) SYSTEM AND METHOD OF RADAR LOCATION

(71) Applicant: Thales, Neuilly sur Seine (FR)

(72) Inventors: Stéphane Kemkemian, Paris (FR); Jean-Paul Artis, Plouzane (FR); Jean-Michel Quellec, Ploumoguer (FR)

(73) Assignee: Thales, Courbevoie (FR)

( * ) Notice: Subject to any disclaimer, the term of this patent is extended or adjusted under 35 U.S.C. 154(b) by 225 days.

(21) Appl. No.: 13/774,770

(22) Filed: Feb. 22, 2013

(65) Prior Publication Data

US 2013/0234878 A1    Sep. 12, 2013

(30) Foreign Application Priority Data

Feb. 24, 2012  (FR) ..................... 12 00547

(51) Int. Cl.
| | |
|---|---|
| *G01S 13/06* | (2006.01) |
| *G01S 7/285* | (2006.01) |
| *G01S 7/36* | (2006.01) |
| *G01S 7/292* | (2006.01) |
| *G01S 13/10* | (2006.01) |
| *G01S 13/28* | (2006.01) |
| *G01S 13/00* | (2006.01) |
| *G01S 7/00* | (2006.01) |

(52) U.S. Cl.
CPC ............. *G01S 13/06* (2013.01); *G01S 7/285* (2013.01); *G01S 7/2921* (2013.01); *G01S 13/103* (2013.01); *G01S 13/282* (2013.01); *G01S 7/36* (2013.01)

(58) Field of Classification Search
CPC ........... G01S 7/02; G01S 7/28; G01S 7/2813; G01S 7/285; G01S 7/292; G01S 7/2921; G01S 7/36; G01S 13/02; G01S 13/06; G01S 13/08; G01S 13/10; G01S 13/103; G01S 13/24; G01S 13/26; G01S 13/28; G01S 13/282
USPC ............... 342/13–20, 82–103, 118, 134–145, 342/175, 189, 192–197
See application file for complete search history.

(56) References Cited

U.S. PATENT DOCUMENTS

| | | | | |
|---|---|---|---|---|
| 4,135,189 | A | * | 1/1979 | Josse ............................... 342/18 |
| 4,358,766 | A | * | 11/1982 | Mehron ........................... 342/18 |
| 5,017,921 | A | * | 5/1991 | McGill et al. ................... 342/18 |

(Continued)

FOREIGN PATENT DOCUMENTS

| | | |
|---|---|---|
| FR | 2146105 A1 | 3/1973 |
| GB | 1380451 A | 1/1975 |
| WO | 2011106881 A1 | 9/2011 |

*Primary Examiner* — Bernarr Gregory
(74) *Attorney, Agent, or Firm* — Baker & Hostetler LLP

(57) ABSTRACT

A system and method of radar location comprises radar signal emission means, an emitted pulse of duration T1 and index i starting at instant T2(i); means receiving reflected radar signals; means determining correlation between reconstruction of an emitted pulse and signal received during the time interval between T2(i)+2*T1 and T2(i+1). The means determining a correlation can reconstruct a set, of at least one truncated pulse j of duration T3(j), less than T1, corresponding to the final part of said emitted pulse, said truncated pulses having increasing respective durations, determining at least one first correlated signal j by correlation of said truncated pulse j and signal received during time interval between T2(i)+T1 and T2(i)+T1+T3(j) and determining a second signal, based on first correlated signals j, by copying the time interval, of said correlated signal j, between T2(i)+T1+T3(j) and T2(i)+T1+T3(j+1), onto the time interval, of said second signal, between T2(i)+T1+T3(j) and T2(i)+T1+T3(j+1).

8 Claims, 2 Drawing Sheets

(56) References Cited

U.S. PATENT DOCUMENTS

| | | | |
|---|---|---|---|
| 5,291,202 A * | 3/1994 | McClintock | 342/16 |
| 5,311,541 A * | 5/1994 | Sanderford, Jr. | 342/18 |
| 5,377,222 A * | 12/1994 | Sanderford, Jr. | 342/18 |
| 5,537,117 A * | 7/1996 | Rose | 342/17 |
| 5,539,407 A * | 7/1996 | Scholz | 342/17 |
| 6,760,363 B1 | 7/2004 | Bettaieb | |
| 6,937,639 B2 * | 8/2005 | Pendergrass et al. | 342/18 |
| 2011/0037643 A1 | 2/2011 | Torin et al. | |

\* cited by examiner

SYSTEM AND METHOD OF RADAR LOCATION

CROSS-REFERENCE TO RELATED APPLICATION

This application claims priority to foreign French patent application No. FR 1200547, filed on Feb. 24, 2012, the disclosure of which is incorporated by reference in its entirety.

FIELD OF THE INVENTION

The present invention relates to a radar location system, using an emitter and a receiver of radar signals and making it possible by reflection of the waves emitted on objects to detect and to locate these objects. It applies in the field of the detection and location of objects in particular in the case where location of objects close to the system is necessary.

BACKGROUND

In the case of a radar system using a "solid state" emission system, (a "solid state" emitter uses devices, in particular transistors, in which the current flows in semi-conducting materials which are solid as opposed to a vacuum tube emitter where the current consists of a confined electron beam which consists of an electron "gas") the radar signals generally use a succession of pulses of duration T1. Moreover they must exhibit the highest possible ratio between the mean power emitted and maximum power emitted, thus it is necessary to have long pulses. Indeed, the cost of solid-state emission systems depends mainly on the maximum power, but the range of the radar depends by contrast mainly on the mean power.

One of the drawbacks related to the use of long pulses, in the conventional case of mono-static radars, is the presence of zones in which the radar cannot locate objects. Indeed, beyond about ten Watts of emitted power, it is impossible to emit and to receive simultaneously, except by using two separate antennas, this being expensive and generally very difficult to do for airborne systems constrained by size. It will not therefore be possible to receive a reflected signal during the emission of the emitted signal. For example, if the object causing the reflection is close by, the reflected signal arrives too early (the radar is still in the process of emitting) and the reception of this reflected signal will be impossible. Another zone in which the radar cannot locate any object is situated at the end of the location zone. Indeed, in this case a reflected pulse will return to the emitter at the same time as the next pulse emitted. The most troublesome zone in which the radar cannot locate any object is that which is situated at short range. Indeed, the masked zone situated at the end of the domain is not very troublesome since it suffices to increase the pulse repetition period (PRI) if it is desired to observe pulses reflected in this distance domain.

For pulses of duration T1, if the shape factor of the radar is h=T1/PRI, then the unusable spatial domain (geographical zone in which the radar is not capable of locating an object) is the zone situated at a distance of less than the distance travelled by a pulse during the time T1.

Systems are known which use emitted pulses which are not modulated, and in this case, it is possible to partially use the fraction of the pulse received which does not lie in the reception cutoff caused by the emission of the said pulse. Thus by using these systems it is possible to use the totality of the distance domain. On the other hand, the sensitivity is reduced in the incomplete zones. This sensitivity is all the more limited as the masking becomes more significant.

In order to improve the resolution of the locating system it is known to use a radar signal consisting of pulses containing a particular code so as to increase the spread band of the frequencies B of the signal emitted for a given pulse duration. If the compression caused by the particular code is ideal, the energy of the initial pulse of duration $T_1$ is preserved but is concentrated in a much smaller duration $t_1=1/B$. The power of the compressed pulse is therefore increased in the ratio $$\frac{T_1}{t_1} = BT_1.$$

Now, in the case of the use of certain coded pulses, for example using Barker codes, the standard detection procedures, applied to a fraction of the pulse received, cause degraded detection and degraded accuracy, since the code is incomplete. This degradation may give rise, for example, to multiple correlation spikes leading to position ambiguities or to a large decline in the power of the pulses and therefore to a loss in effectiveness of the radar.

Systems are also known which use pulses containing a code whose pulse repetition period is reduced by a factor N with respect to the initial signal. The pulse duration is reduced by the same factor N, thereby also dividing by N the length of the zone in which the radar cannot locate any object. However with these modifications alone, the system and the signal become inoperative since it becomes ambiguous distance-wise in a zone in which the initial signal was not ambiguous distance-wise.

To limit this ambiguity, a solution is known which is to emit a succession of N pulses of different frequencies. The frequency spacing of these N pulses must be such that the inter-correlation function for these pulses is low enough that it is possible to say without ambiguity from which pulse an echo originates. In the simplest of the known realizations, the reception is narrowband, that is to say the bandwidth of the receiver is matched to the band of a pulse. To receive the echoes originating from the various frequencies, the central reception frequency is simply shifted. The drawback of this simple procedure is that, at a given instant, only 1/N of the instrumented domain can be received. To receive the whole of the instrumented domain, the receiver has to be successively recentred on the N frequencies. This gives rise:
  Either to a lengthening of the time necessary for the surveillance of the entire domain in terms of distance, if a constant observation time is kept for a given frequency;
  Or to a reduction in the observation time for a given pseudo-ambiguity if it is desired to preserve a constant observation time for the totality of the domain in terms of distance (this gives rise to a loss of sensitivity).

In a more advanced realization, the reception is wideband, that is to say the bandwidth of the receiver covers the totality of the spectrum corresponding to the N frequencies. The signals received in the N frequencies are received simultaneously and assigned to the right frequency by virtue of appropriate frequency filtering (analogue or digital).

The latter realization makes it possible to counter the problem of the zone in which the radar cannot locate any object, this zone being significant at short range. On the other hand, it creates a new problem, namely the appearance of N−2 zones in which the radar cannot locate any object, in the central part of the distance domain. To solve this problem, it is necessary to emit, over several observation sequences, a signal whose PRI is made to vary slightly from sequence to sequence so as to displace the blind central zone. However this solution does not allow optimal performance in the central zone.

SUMMARY OF THE INVENTION

The subject of the present invention is therefore a radar location system allowing accurate location at short range and not exhibiting the drawbacks of the systems known in the prior art.

Thus there is proposed in accordance with an aspect of the invention a system for radar location comprising radar signal emission means 101, the said signal comprising at least one emitted pulse, an emitted pulse having a duration T1 and an associated index i and starting at an instant T2(*i*). Moreover the said pulse being modulated by at least one code preserving good autocorrelation properties when a fraction of the said code is used. The system also comprises means 102 for receiving reflected radar signals, means 103 for determining a correlation between a reconstruction of an emitted pulse and the radar signal received during the time interval starting at T2(*i*)+2*T1 and finishing at T2(*i*+1). The said system being characterized in that the said means for determining a correlation are furthermore adapted for reconstructing a set, of at least one truncated pulse j, a truncated pulse j being of duration T3(*j*), smaller than the duration of the emitted pulse T1 and corresponding to the final part of the said emitted pulse, the said truncated pulses being of increasing respective durations, determining at least one first correlated signal j by correlation of the said truncated pulse j and of the signal received during the time interval starting at T2(*i*)+T1 and finishing at T2(*i*)+T1+T3(*j*) determining a second signal, on the basis of all or part of the first correlated signals j, by copying the time interval, of the said correlated signal j, starting at T2(*i*)+T1+T3(*j*−1) and finishing at T2(*i*)+T1+T3(*j*), onto the time interval, of the said second signal, starting at T2(*i*)+T1+T3(*j*−1) and finishing at T2(*i*)+T1+T3(*j*).

Stated otherwise the second signal is obtained by copying various parts of the first signals. This second signal is a signal for which the various spikes represent the various objects that have reflected the radar wave and which are located in the environment of the radar.

This system therefore makes it possible to locate an object situated very close by, indeed it makes it possible to undertake location even if a part of the reflected pulse arrives at the receiver during the emission of this said pulse.

According to one embodiment the said means 103 for determining a correlation are furthermore adapted for multiplying the temporal samples of the said truncated pulses by a respective weighting coefficient belonging to a weighting window.

This technical characteristic makes it possible to improve the accuracy of location.

According to one embodiment the said means for determining a correlation are furthermore adapted, on the basis of a reconstructed pulse j, for computing a first vector corresponding to the discrete fourrier transform of the signal received on the interval from T2(*i*)+T1 to T2(*i*)+T1+T3(*j*), determining a second vector corresponding to the discrete fourrier transform of the time reversal of the complex conjugate of the reconstructed pulse j and computing the said first correlated signal j by inverse discrete Fourier transform of the term-by-term multiplication of the first and of the second vector.

This technical characteristic makes it possible to reduce the needs in terms of computational resource of the modules and devices used by the system.

According to one embodiment the said emission means 101 are furthermore adapted for the emission of radar signals comprising at least one pulse modulated by using a linear or nonlinear frequency ramp and the said reception module is adapted for the reception of radar signals comprising the said pulses modulated by using a linear or nonlinear frequency ramp.

According to one embodiment the said means 103 for determining a correlation are furthermore adapted, on the basis of a reconstructed pulse j, for filtering the samples of the said second signal, over an interval starting at T2(*i*)+T1+T3(*j*) and finishing at T2(*i*)+T1+T3(*j*+1) so that a sample of the said interval is equal to the weighted average of the neighbour samples of the said sample.

For example, if in one of the zones, the resolution is k times higher than necessary, then $$Y_i = \frac{1}{\beta} f^{-1}\left(\sum_{u=-U}^{U} f(a_u X_{i+u})\right)$$

will be computed in a sliding or non-sliding manner. In this equation $f$ is a monotonic function and the coefficients $a_u$ are chosen so as to obtain the sought-after impulse response. It is possible for example to use a=1, U=k/2, $f(x)=x^2$ and $\beta=1$.

These two technical characteristics make it possible to improve the accuracy of location.

According to one embodiment the said emission means 101 are adapted for using a set of different frequencies for the emission of the said pulses of the said radar signals and the said reception means 102 are adapted for receiving the said pulses of the said reflected radar signals on the said different frequencies.

According to one embodiment the system furthermore comprises means for determining a third synchronization signal, for an emitted pulse i using a frequency, by the term-by-term addition, for all or some of the emitted pulses j using the same frequency, of the samples of the interval of the said reflected radar signal starting at T2(*j*)+T1 and finishing at T2(*j*)+2*T1, the said addition being stored in the time interval, of the said third signal, starting at T2(*i*)+T1 and finishing at T2(*i*)+2*T1. Moreover the said means 103 for determining a correlation are furthermore adapted for the correlation between the reconstruction of an emitted pulse and the time interval, of the said third signal, starting at T2(*i*)+2*T1 and finishing at T2(*i*+1)

According to one embodiment the method of radar location uses the system presented in the invention and comprises the following steps: a step 401 of detecting a possible jamming source, a step 402, in the case of non-detection of a jamming source, of emitting and receiving a radar signal for which the pulses forming part of one and the same group of successive pulses use an identical emission frequency, the emission frequency varying from one group to the next and a step 403, in the case of detection of a jamming source, of emitting and receiving a radar signal using different frequencies for two successive pulses, the frequencies following a periodic or nonperiodic distribution law.

These three technical characteristics make it possible to improve the accuracy of location, by virtue of the frequency diversity, afforded by the use of different frequencies.

BRIEF DESCRIPTION OF THE DRAWINGS

The invention will be better understood and other advantages will become apparent on reading the detailed description and with the aid of the figures among which.

DETAILED DESCRIPTION

Figure 1:
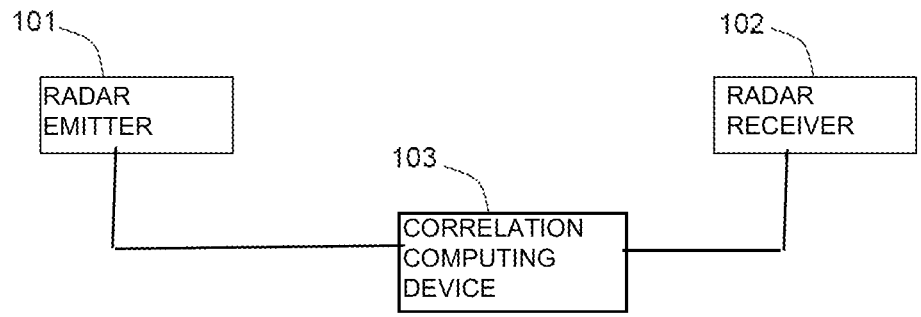
FIG. 1 presents a first embodiment of the locating system in accordance with an aspect of the invention.

The system as presented in FIG. 1 in accordance with an aspect of the invention comprises a module 101 for emitting radar signals, a module 102 for receiving radar signals and a module 103 for determining a correlation on the basis of the radar signals received. The emission module 101 uses radar signals consisting of a succession of pulses modulated by certain particular codes. These codes must be such that they preserve good autocorrelation properties, even if a fraction of the code is used. By way of example, this property is satisfied by:

pulses modulated by using a linear or nonlinear frequency ramp known also by the English term chirps. Indeed these pulses, even if they are truncated, remain of the same type;

noise codes, indeed a fraction of pseudo-random sequence remains a pseudo-random sequence.

On the other hand, the property is not satisfied on Barker codes. Indeed a truncated Barker code is no longer a Barker code.

The pulses emitted are of identical size T1 and a pulse begins at the instant T2($i$). The module 103 for determining a correlation uses two types of processing, as a function of the reception time interval considered:

In the time interval starting at T2($i$)+2*T1 and finishing at T2($i$+1), the reflected pulse is received completely and it is not masked by the emission of the actual pulse or of the next pulse;

In the time interval starting at T2($i$)+T1 and finishing at T2($i$)+2*T1, a part of the reflected pulse is masked by the emission of the actual pulse.

In the time interval starting at T2($i$)+2*T1 and finishing at T2($i$+1), a processing of correlation with a reconstructed pulse is employed (this processing is also known by the name pulse compression). The correlation can also be carried out through the use of a discrete Fourier transform.

The discrete Fourrier transform procedure is carried out thus:

Computation of a Fourier transform of the signal received in the time interval starting at T2($i$)+2*T1 and finishing at T2($i$+1), this time interval comprising NFFT samples.

Computation of the time reversal of the complex conjugate of a reconstruction of the emitted pulse (t→−t).

Computation over the same number of samples (NFFT) of the discrete Fourrier transform of the reversed and conjugate reconstructed pulse.

Computation of the sample-by-sample multiplication of the two vectors.

Computation of the inverse discrete Fourier transform of the product, so as to obtain a signal in the time domain.

This therefore corresponds to the correlation of the signal received by the reconstruction of the time-reversed emitted pulse, that is to say to computing the intercorrelation of the signal received by the complex conjugate of the reconstruction of the pulse emitted.

The correlation procedure uses a conventional matched filter. This procedure is however computationally more unwieldy than the discrete Fourier transform procedure for compressions of significant "BT". The acronym "BT" usually designates the product of the frequency spreading band of the coded pulse B and the length of the initial pulse T. If the compression caused by the particular code is ideal, the energy of the initial pulse of duration $T_1$ is preserved but is concentrated in a much smaller duration $t_1=1/B$. The power of the compressed pulse is therefore increased in the ratio $$\frac{T_1}{t_1} = BT_1.$$

This is why the discrete Fourier transform procedure is preferred to the correlation procedure.

Figure 2:
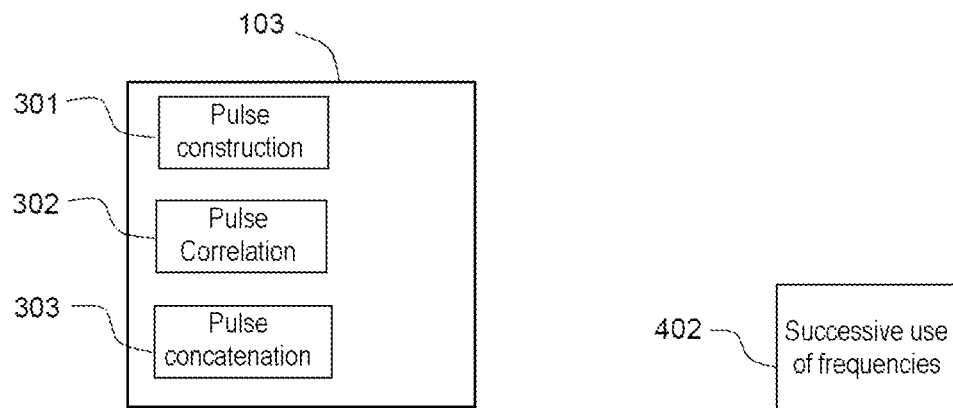
FIG. 2 presents the manner of operation of the device for concatenating the correlated signals in accordance with an aspect of the invention.

In the time interval starting at T2($i$)+T1 and finishing at T2($i$)+2*T1, the processing is carried out for various temporal instants T2($i$)+T1+T3($j$) belonging to the time interval starting at T2($i$)+T1 and finishing at T2($i$)+2*T1. The module for determining a correlation in accordance with this embodiment is presented in FIG. 2 and comprises the following devices. A device 301 for reconstructing a pulse makes it possible to obtain a pulse corresponding to the final part of the initial pulse and of duration T3($j$). A device 302 for correlating a reconstructed pulse j with the radar signal received over the time interval starting at T2($i$)+T1+T3($j$−1) (with T3(0) being equal to 0) and finishing at T2($i$)+T1+T3($j$) is present. Finally the last device is the device 303 for concatenating the correlated signals into one and the same signal.

It is thus postulated, for each reconstructed pulse j, that a reflected pulse will have its maximum correlation spike at the delay T3($j$), and thus that it is possible to ascertain a priori which reconstructed pulse is the one which will maximize the signal-to-noise ratio on this possible reflected pulse. This expedient makes it possible to ensure that at any point of the zone the correlation gives an optimal signal-to-noise ratio correlation spike.

In order to simplify the various computations it is possible to use just a limited number, N, of reconstructed pulses. This embodiment having the drawback of not having a reconstructed replica perfectly matched to each of the samples of the signal received. It is also possible to use a discrete Fourier transform processing.

In this embodiment the device 301 for reconstructing a pulse is adapted for computing and storing N reconstructed pulses corresponding to the final part of the emitted pulse and having different sizes. The samples of these N reconstructed pulses can each be weighted by an individual law so as to lower the level of sidelobes. A discrete Fourier transformation is thereafter applied to these N reconstructed pulses. These reconstructed pulses can be computed at the time of the processing or else before the processing and stored in a memory. In the case where 6 pulses are reconstructed it is possible to reconstruct for example the following pulses:

The first reconstructed pulse corresponding to the last 15 percent of the emitted pulse The second reconstructed pulse corresponding to the last 30 percent of the emitted pulse The third reconstructed pulse corresponding to the last 45 percent of the emitted pulse The fourth reconstructed pulse corresponding to the last 60 percent of the emitted pulse The fifth reconstructed pulse corresponding to the last 75 percent of the emitted pulse The sixth reconstructed pulse corresponding to the whole of the emitted pulse.

The correlation device 302 is adapted for:

Computing the discrete Fourier transform of the signal received.

Multiplying term by term, the discrete Fourrier transform of the signal received and the N reconstructed pulses.

Computing the inverse discrete Fourier transform of the N term-by-term multiplications.

All these correlations are normalized to constant noise, that is to say the noise floor after correlation is the same for all the lengths of the reconstructed pulses used. This is carried out by assuming that the power of the noise received is constant as a function of time and that the sampling is matched to the passband of the receiver. Under these conditions, the noise of the successive samples has a zero autocorrelation outside of a delay τ=0. If the replica uses n samples, the noise is therefore multiplied in power by n (quadratic summation of the set of noise samples). The complex signal is therefore normalized by α√n where α is an arbitrary and constant gain for all the compressions.

Figure 3:
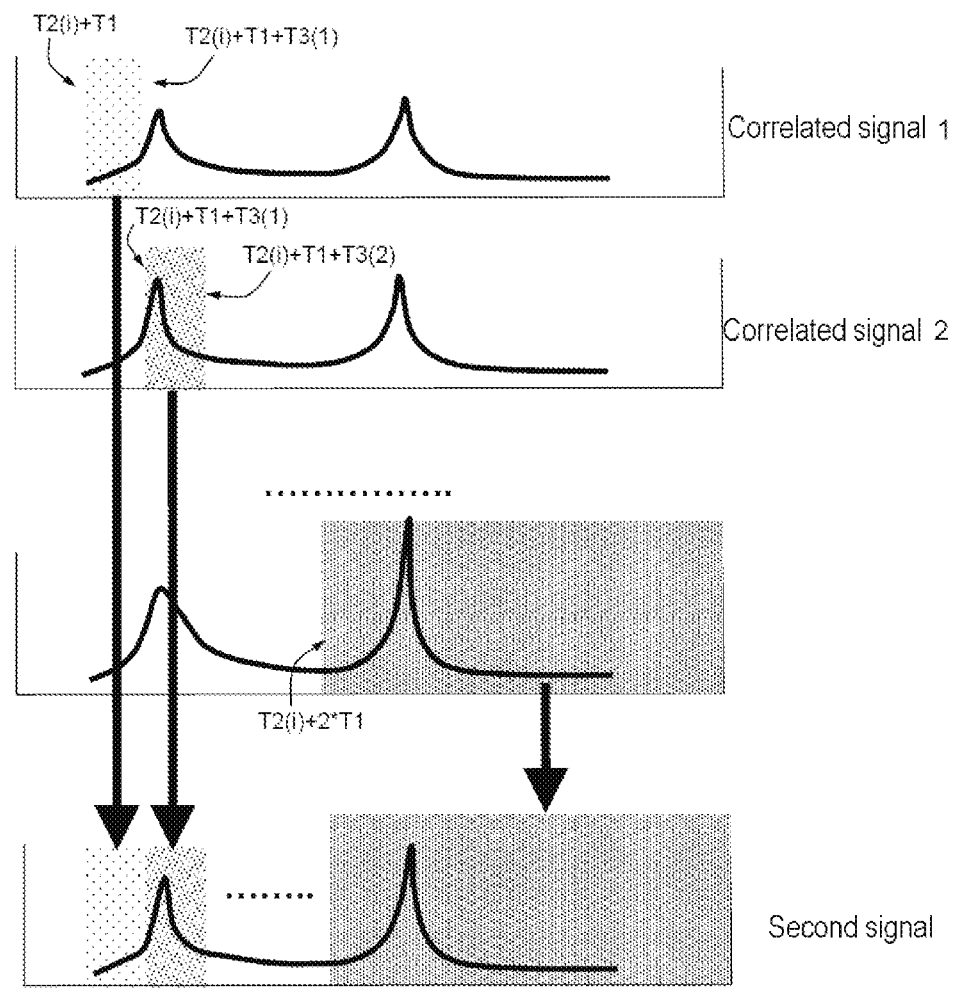
FIG. 3 presents the manner of operation of the concatenation device.

Finally the concatenation device 303 is adapted furthermore for making it possible to select, in each of the N signals correlated by N reconstructed pulses, the useful zone of this correlation and to construct a second signal by copying the samples of the time interval, of the correlated signal j, starting at T2($i$)+T1+T3($j$−1) and finishing at T2($i$)+T1+T3($j$), onto the time interval, of the second signal, starting at T2($i$)+T1+T3($j$−1) and finishing at T2($i$)+T1+T3($j$). Likewise the samples of the correlated signal of the interval starting at T2($i$)+2*T1 and finishing at T2($i$+1) are copied onto the time interval, of the second signal, starting at T2($i$)+T1+T3($j$−1) and finishing at T2($i$)+T1+T3($j$). FIG. 3 presents a mode of operation of the device 303. The useful part of the correlated signal 1 begins at T2($i$)+T1 and finishes at T2($i$)+T1+T3(1), indeed T3(0)=0. The useful part of the correlated signal 2 begins at T2($i$)+T1 and finishes at T2($i$)+T1+T3(1), indeed T3(0)=0. These two parts are thereafter copied onto the second signal.

In one embodiment the pulses modulated by using a non-linear frequency ramp (also known by the term nonlinear chirp or "S" chirp) are used. The advantage of this type of pulse is of exhibiting, in the complete correlation zone, a spectrum such that the amplitude weighting is fruitless, therefore of not causing any loss due to the weighting in this zone. On the other hand, in the incomplete correlation zone, this property is lost as the visible fraction of the pulse wanes. Amplitude weighting is then desirable.

In the case of the use of a pulse modulated by a frequency ramp, the spread band of the frequencies of the reconstructed pulse depends on the length of this pulse. The spatial resolution (minimum separation between two points such that the radar detects these two points independently) depends on the spread band of the frequencies. Therefore the longer the reconstructed pulse, the larger the frequency spread band it uses and therefore the better its spatial resolution. Therefore if the spread band of the frequencies of the emitted pulse is computed so that the shortest reconstructed pulse satisfies the spatial resolution criterion, then in the case of the complete reconstructed pulse the spread band of the frequencies being larger, the spatial resolution risks being too accurate (two points that ought to be perceived as being conjoined run the risk of being perceived in a separated manner). The correlation module can therefore comprise a filtering device. This filtering can use a formula using a monotonic function (power, Log., etc.) and its aim is to render the distance resolution identical for all the signals correlated with the reconstructed pulses. The filtering function may be different on the various intervals starting at T2($i$)+T1+T3($j$) and finishing at T2($i$)+T1T3($j$). For example, if in one of the zones, the resolution is k times higher than necessary, then $$Y_i = \frac{1}{\beta} f^{-1}\left(\sum_{u=-U}^{U} f(a_u X_{i+u})\right)$$

will be computed in a sliding or non-sliding manner. In this equation $f$ is a monotonic function and the coefficients $a_u$ are chosen so as to obtain the sought-after impulse response. It is possible for example to use a=1, U=k/2, $f(x)=x^2$ and β=1.

In one embodiment the system allows the use of several frequencies so as to carry out the various processings by using frequency diversity to smooth the target fluctuations. From 5 to 15 fairly spaced emission frequencies suffice to obtain the frequency diversity and decorrelation effect. In this embodiment the emission module and the reception module are adapted for the emission and the reception of the signals in such a way as to use several frequencies. Devices making it possible to effect this emission and this reception are known in the prior art.

The organization of the various frequencies may be of two different types. In a first type the frequencies used by successive pulses are identical. The emission frequency is modified after a certain number of occurrences of the pulses. In a second type the frequency used by two successive pulses is different and the use of the frequencies follows a distribution law that may be periodic.

The first type of use of the frequencies exhibits the advantage of restricting the temporal spacing between the pulses summed together, therefore of improving the accuracy of location of objects moving at non-constant speed. On the other hand, by having sequences of several pulses at constant frequency, it exhibits certain weaknesses. In particular the risk of false alarm due to ambiguous reflected pulses of large radar cross section is increased and the system is more disturbed by jamming sources on account of the partial absence of frequency agility.

The second type of use of the frequencies exhibits the advantage of limiting the risk of false alarm due to ambiguous reflected pulses of large radar cross section it also allows a greater robustness in relation to the jamming sources, on account of the pulse-to-pulse frequency agility. However this second type of use of the frequencies is less robust in relation to the motions of the targets at non-constant speed.

In both types of use of the frequencies, the module 103 for determining a correlation comprises inter alia a synchronization device, making it possible to synchronize the reflected pulses corresponding to the same frequency and to add together in one and the same signal the samples of the time intervals of the signal received corresponding to the reception of these reflected pulses. Thus for an emitted pulse i using an emission frequency, the emitted pulses j using the same frequency are determined, and then for all or some of the emitted pulses j the samples of the interval of the said reflected radar signal starting at T2($j$)+T1 and finishing at T2($j$)+2*T1 are added together and stored in the interval of a third signal starting at T2(*i*)+T1 and finishing at T2(*i*)+2*T1.

Figure 4:
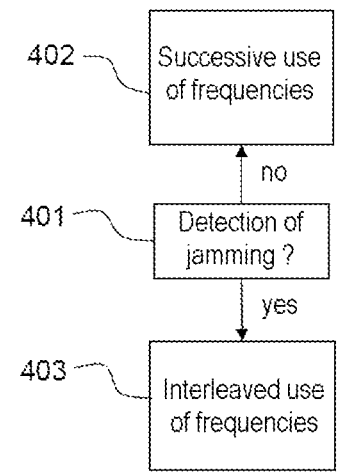
FIG. 4 presents the device for choosing the disposition of the frequencies.

FIG. 4 presents the method of choosing between the distribution of the frequencies in accordance with the type 1 and the distribution of the frequencies in accordance with the type 2. This method comprises:

A step 401 of detecting a possible jamming source

A step 402 of emitting and receiving a radar signal using for pulses, forming part of one and the same group of successive pulses, an identical emission frequency, the emission frequency varying from one group to the next. This step is used in the case of non-detection of a jamming source A step 403 of emitting and receiving a radar signal using different frequencies for two successive pulses, the frequencies following a periodic or nonperiodic distribution law. This step is used in the case of detection of a jamming source.

The invention claimed is:

1. A system for radar location comprising:
    radar signal emission means, configured to emit a radar signal comprising at least one emitted pulse, an emitted pulse having a duration T1 and an associated index i and starting at an instant T2(*i*), said pulse being modulated by at least one code preserving good autocorrelation properties when a fraction of the said code is used;
    means for receiving reflected radar signals;
    means for determining a correlation between a reconstruction of the at least one emitted pulse and the radar signal received during a time interval starting at T2(*i*)+2*T1 and finishing at T2(*i*+1);
    said means for determining the correlation being further adapted for:
        reconstructing a set, of at least one truncated pulse j, a truncated pulse j being of duration T3(*j*), smaller than the duration of the emitted pulse T1 and corresponding to a final part of the said emitted pulse, said truncated pulses being of increasing respective durations,
        determining at least one first correlated signal j by correlation of said truncated pulse j and of the reflected radar signal received during the time interval starting at T2(*i*)+T1 and finishing at T2(*i*)+T1+T3(*j*),
        determining a second signal, on the basis of all or part of the set of correlated signals j, by copying the time interval, of said correlated signals j, starting at T2(*i*)+T1+T3(*j*−1) and finishing at T2(*i*)+T1+T3(*j*), onto the time interval, of said second signal, starting at T2(*i*)+T1+T3(*j*−1) and finishing at T2(*i*)+T1+T3(*j*).

2. The system according to claim 1, in which said means for determining a correlation are further adapted for multiplying the temporal samples of said truncated pulses by a respective weighting coefficient belonging to a weighting window.

3. The system according to claim 1, in which said means for determining a correlation are further adapted, on the basis of a reconstructed pulse j, for:
    computing a first vector corresponding to a discrete Fourier transform of the reflected radar signal received on the interval from T2(*i*)+T1 to T2(*i*)+T1+T3(*j*),
    determining a second vector corresponding to the discrete Fourier transform of a time reversal of a complex conjugate of the reconstructed pulse j, and
    computing said first correlated signal j by inverse discrete Fourier transform of a term-by-term multiplication of the first vector and of the second vector.

4. The system according to claim 1, in which said emission means are further adapted for the emission of radar signals comprising at least one pulse modulated by using a linear or nonlinear frequency ramp and said means for receiving is adapted for the reception of the radar signals comprising said pulses modulated by using a linear or nonlinear frequency ramp.

5. The system according to claim 4, in which said means for determining a correlation are further adapted, on the basis of a reconstructed pulse in the set of pulses j, for filtering samples of said second signal, over an interval starting at T2(*i*)+T1+T3(*j*) and finishing at T2(*i*)+T1+T3(*j*+1) such that a sample of said interval is equal to a weighted average of neighbouring samples of said sample.

6. The system according to claim 1, in which said radar signal emission means are adapted for using a set of different frequencies for the emission of the said pulses of said radar signals and said means for receiving are adapted for receiving said pulses of said reflected radar signals on said different frequencies.

7. The system according to claim 1 further comprising:
    means for determining a third synchronization signal, for an emitted pulse i using a frequency, by the term-by-term addition, for all or some of the emitted pulses j using the same frequency, of the samples of the interval of said reflected radar signal starting at T2(*j*)+T1 and finishing at T2(*j*)+2*T1, said addition being stored in the time interval, of said third signal, starting at T2(*i*)+T1 and finishing at T2(*i*)+2*T1;
    said means for determining the correlation being further adapted for the correlation between the reconstruction of the emitted pulse and the time interval, of said third signal, starting at T2(*i*)+2*T1 and finishing at T2(*i*+1).

8. A method of radar location using a radar location system including a radar signal emission means and means for receiving reflected radar signals, said radar signal emission means are adapted for using a set of different frequencies for the emission of the said pulses of said radar signals and said reception means for receiving are adapted for receiving said pulses of said reflected radar signals on said different frequencies the method comprising the following steps:
    detecting, using the means for receiving the reflected radar signals, a possible jamming source,
    in the case of non-detection of the jamming source, emitting, usinq the radar signal emission means, and receiving, using the means for receiving the reflected radar signals, a radar signal among the reflected radar signals for which the pulses forming part of one and the same group of successive pulses use an identical emission frequency, the emission frequency varying from one group to the next, and
    in the case of detection of the jamming source, emitting, using the radar signal emission means, and receiving, using the means for receiving the reflected radar signals, the radar signal using different frequencies for two successive pulses, the frequencies following a periodic or nonperiodic distribution law.

\* \* \* \* \*